United States Patent [19]

Rottger

[11] Patent Number: 5,312,025
[45] Date of Patent: May 17, 1994

[54] METHOD OF AND DEVICE FOR MANUFACTURING BANDS OF STEEL

[76] Inventor: Rolf Rottger, Wallenbrücker Str 9, 4520 Melle 7, Fed. Rep. of Germany

[21] Appl. No.: 916,564

[22] Filed: Jul. 20, 1992

[51] Int. Cl.⁵ .................................. B23K 37/00
[52] U.S. Cl. .................................. 228/15.1; 228/5.7; 228/5.1
[58] Field of Search .............. 228/5.7, 5.1, 13, 44.3, 228/49.1, 49.4, 170, 173.6

[56] References Cited

U.S. PATENT DOCUMENTS

| | | | |
|---|---|---|---|
| 3,403,833 | 10/1968 | Wheeler et al. | 228/5.7 |
| 3,426,952 | 2/1969 | Chew et al. | 228/5.7 |
| 3,458,103 | 7/1969 | Davis | 228/5.7 |
| 4,765,532 | 8/1988 | Uomoti et al. | 228/5.7 |
| 4,854,493 | 8/1989 | Fujii et al. | 228/44.3 |

Primary Examiner—Paula A. Bradley
Assistant Examiner—Chuck Y. Mah
Attorney, Agent, or Firm—Sprung Horn Kramer & Woods

[57] ABSTRACT

A device for manufacturing loops of steel employed in continuous-operation presses to manufacture single-layer or multiple-layer webs of material. To equalize the tension in the ends of a strip before they are welded together to form a loop and to increase the strength of the weld, the strip (10) is laid over drums (2 and 3) and its ends secured in grippers (13) that travel across the drums' axes (4 and 5). The strip is tensioned to a prescribed tension. The tension is maintained while the ends (11 and 12) of the strip are secured by transverse tensioning arms. The tension is released by moving the movable axis to an operating distance. The strip is cut with a blade, the ends of the strip are ground parallel, and are welded together to form a loop.

12 Claims, 4 Drawing Sheets

METHOD OF AND DEVICE FOR MANUFACTURING BANDS OF STEEL

BACKGROUND OF THE INVENTION

The invention concerns a method of manufacturing bands or loops of steel with a device including two separate drums with parallel axes, one of the axes stationary and the other transversely variable.

Loops of steel are preferably manufactured from a coil or from several sheets welded together. Once the coil has been uncoiled or the several sheets welded into strips, the length of the desired loop is marked on the tensioned strip with a measuring tape and square and the strip cut with manual or mechanical shears. The strips can be up to 30 m long or longer. At such lengths the longitudinal edges will have tolerances of 5 mm due to the measuring tape's imprecision, to discrepancies in angular measurement, and in particular to inherent distortions in the extended but not tensioned strip.

The accordingly trimmed strip is now welded together into a loop. The strip is wrapped loose around two drums and its ends aligned and secured on a welding surface with the transverse edges in contact or slightly apart depending on what kind of welding is employed. The ends of the strip remain tensioned on the surface during the welding process.

The welded loop is ejected straight. The axis of one drum remains stationary while the other is displaced by an all purpose piston-and-cylinder mechanism until the tension on the loop is approximately 50 N/mm². The tensioned loop is now turned several times around the powered drum. Due to the aforesaid considerable tolerances in the longitudinal edges of the extended strip and to its being welded without being uniformly tensioned, the loop may to run off the drums. To prevent this from occurring, one end of the variable drum is tensioned until the strip travels straight. In this state, in which the tensions in the strip are unequal and the axes of the drums are not parallel, the deviation from the straight is measured during one revolution of the strip.

Such strips are controlled in application by sensing the longitudinal edge of the strip and briefly and alternately adjusting the variable drum axis to keep the strip from running off the drum. The strip's inherent uneven tension has additional control tensions imposed over it. It is precisely the uncompensated tension at both edges that decreases the life of such a loop.

SUMMARY OF THE INVENTION

The object of the invention is an improved method of the aforesaid type that will provide the loop with uniform tension and make the weld that fastens the ends of the strip together very strong.

This object is attained in accordance with the invention in that the ends of the strip extending around the drums are secured in tensioning mechanisms that travel at an angle to the axes of the drums and the strip is tensioned to a prescribed tension, the tension is maintained while the ends of the strip are secured by transverse tensioning arms, the tension is released by moving the moving axis to an operating distance, the strip is sliced by a blade, and the edges of the strip are welded together to form a loop.

Tensioning the strip while it is wrapped about the drum but before its ends have been welded together will produce a uniform tension in the strip.

It is advantageous to grind the deformed edges of the trimmed strip smooth before welding them together to prevent microscopic cracks and to increase the strength of the weld.

A device for carrying out the method in accordance with the invention will now be described with reference to the drawings, wherein

DETAILED DESCRIPTION OF THE INVENTION

Figure 1:
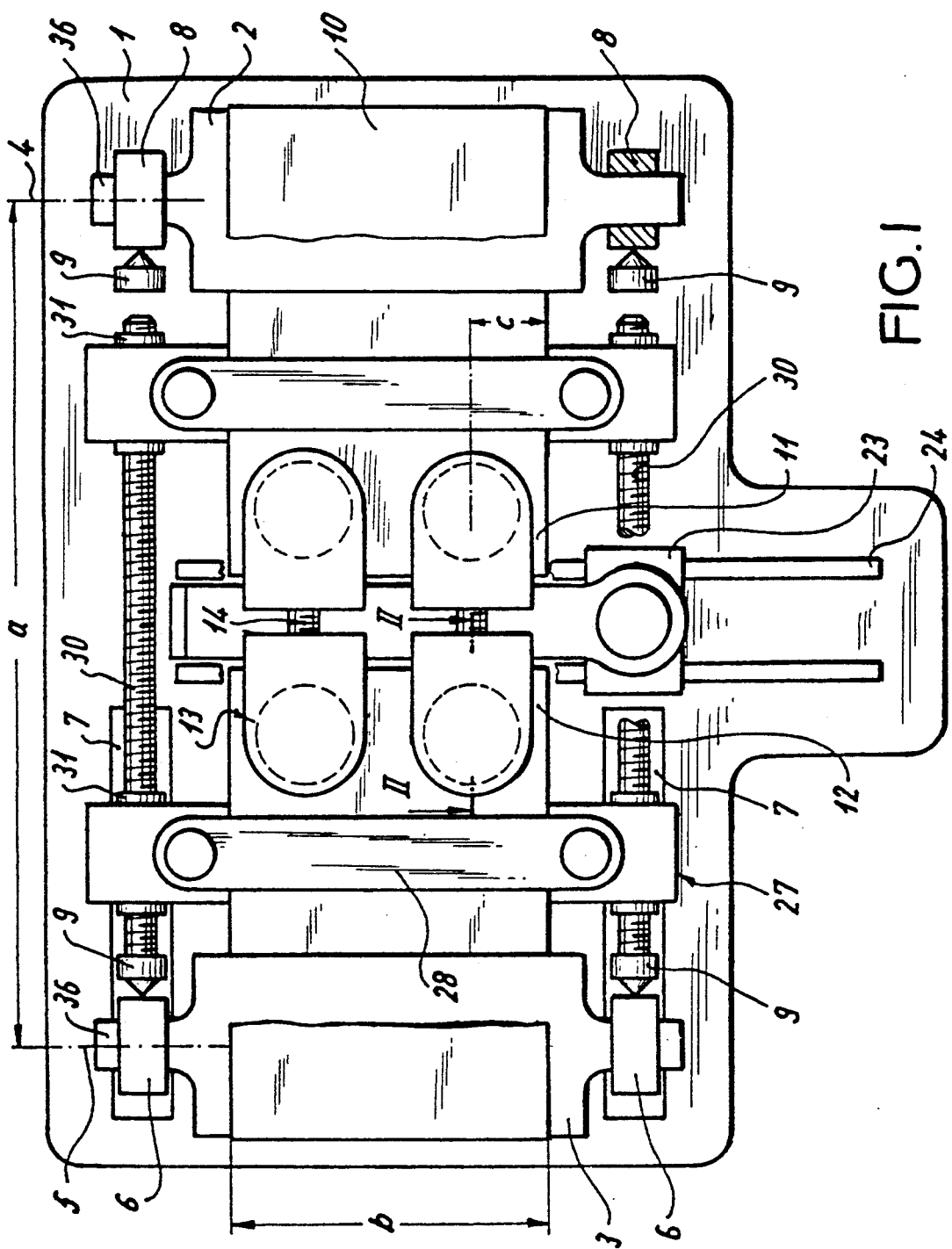
FIG. 1 is a plan of the device with a strip mounted on it and the ends of the strip tensioned.

Referring now more particularly to FIG. 1, the device has a base 1 with drums 2 and 3 mounted on it with their axes 4 and 5 parallel and at the same height. Axis 4 is stationary on base 1 and axis 5 can travel back and forth while remaining parallel to axis 4. The drum's bearings 6 accordingly travel back and forth on rails 7 and can be stopped in any desired position.

The bearings 8 of drum 2 and the bearings 6 of drum 3 rest inside on load-measuring cells 9 that detect the bearing forces oriented toward the device's midpoint. Drums 2 and 3 have the same diameter.

Several disks with the same diameter and rotating independently on axes 4 and 5 can be used instead of drums 2 and 3.

Once a strip 10 of steel has been laid over drums 2 and 3, its ends 11 and 12 are grabbed by grippers 13, each pair of which is connected together for the purpose of applying tension to the strip with a tensioning mechanism 14.

Each gripper 13 has a jaw mechanism 15 that accommodates one end of the strip. The means of tensioning each jaw mechanism 15 comprise a fluid-operated piston 16 and cylinder 17 and a tensioning disk 18 that has the same diameter as the piston and rotates in a cylindrical accommodation 19 in gripper 13.

Since piston 16 and tensioning disk 18 rotate around the same axis, tensions in the strip can be avoided when the distances c between the midplane between two facing grippers and the edge of the strip are not constant.

The tensioning mechanism 14 between the two grippers 13 in the illustrated embodiment is a tensioning shaft with a right-handed thread on one end and a left-handed thread on the other. Ends 20 screw into threaded bores 21 in grippers 13.

The axis 22 of the tensioning shaft is on the same level as the plane between ends 11 and 12.

Grippers 13 are mounted on a carriage 23 that travels back and forth across the device's longitudinal axis and parallel to the axes 4 and 5 of drums 2 and 3.

Carriage 23 is mounted on a transverse support 24 and has guides 25 at each end that fit into grooves 26 in grippers 13.

Figure 2:
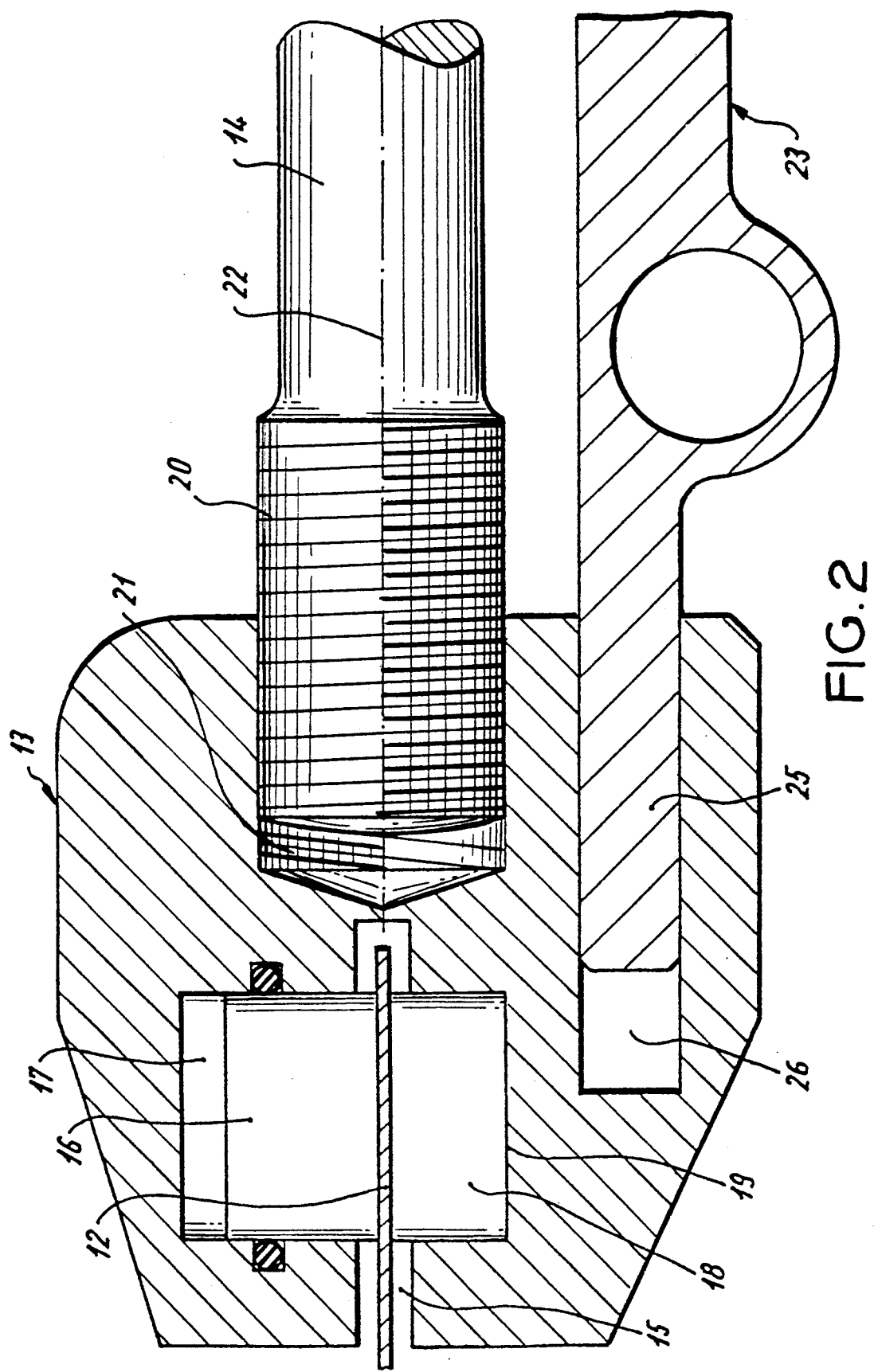
FIG. 2 is a section along the line II—II in FIG. 1.

As will be evident from FIG. 2, grooves 26 allow grippers 13 to travel far enough across carriage 23.

Depending on the width b of the strip, its ends can have two or more pairs of grippers 13 assigned to them.

Transverse support 24 can be adjusted parallel to the axes of the drums or at any desired angle thereto.

Also mounted on base 1 for the purpose of securing the ends of the strip are transverse tensioning arms 27 comprising a strap 28 that extends over and beyond the width of the strip, a pedestal 29, and mechanisms for tensioning the ends of the strap.

Pedestal 29 has threaded bores at each end. Positioning shafts extend through the bores paralleling the length of the device. The positioning shafts can be in the form of rolling-ball spindles 30. They are positioned between the axes 4 and 5 of drums 2 and 3 and extend at a right angle thereto.

Transverse tensioning arms 27 are displaced independently along rolling-ball spindles 30 by incremental motors 31. The spindles are secured stationary to base 1.

The transverse tensioning arm's pedestal 29 accommodates a tensioning cylinder 32 at each end of the strap. A piston 33 travels in and out of tensioning cylinder 32. Its piston rod 34 is equipped with a chuck 35 and constitutes a tensioning bolt that extends through a bore in strap 28.

Bearings 6 and 8 can be removed from the drums' journals 36 on one side of the device. The tensioning bolts 34 can also be extracted from transverse tensioning arms 27 on the same side to allow a strip welded at each end to form a loop to be removed from the device.

Once tensioning mechanisms 14 have tensioned strip 10 as desired, the ends of the strip are secured by transverse tensioning arms 27. Grippers 13 can then be removed from carriage 23 and replaced by a slicing mechanism 37.

Figure 3:
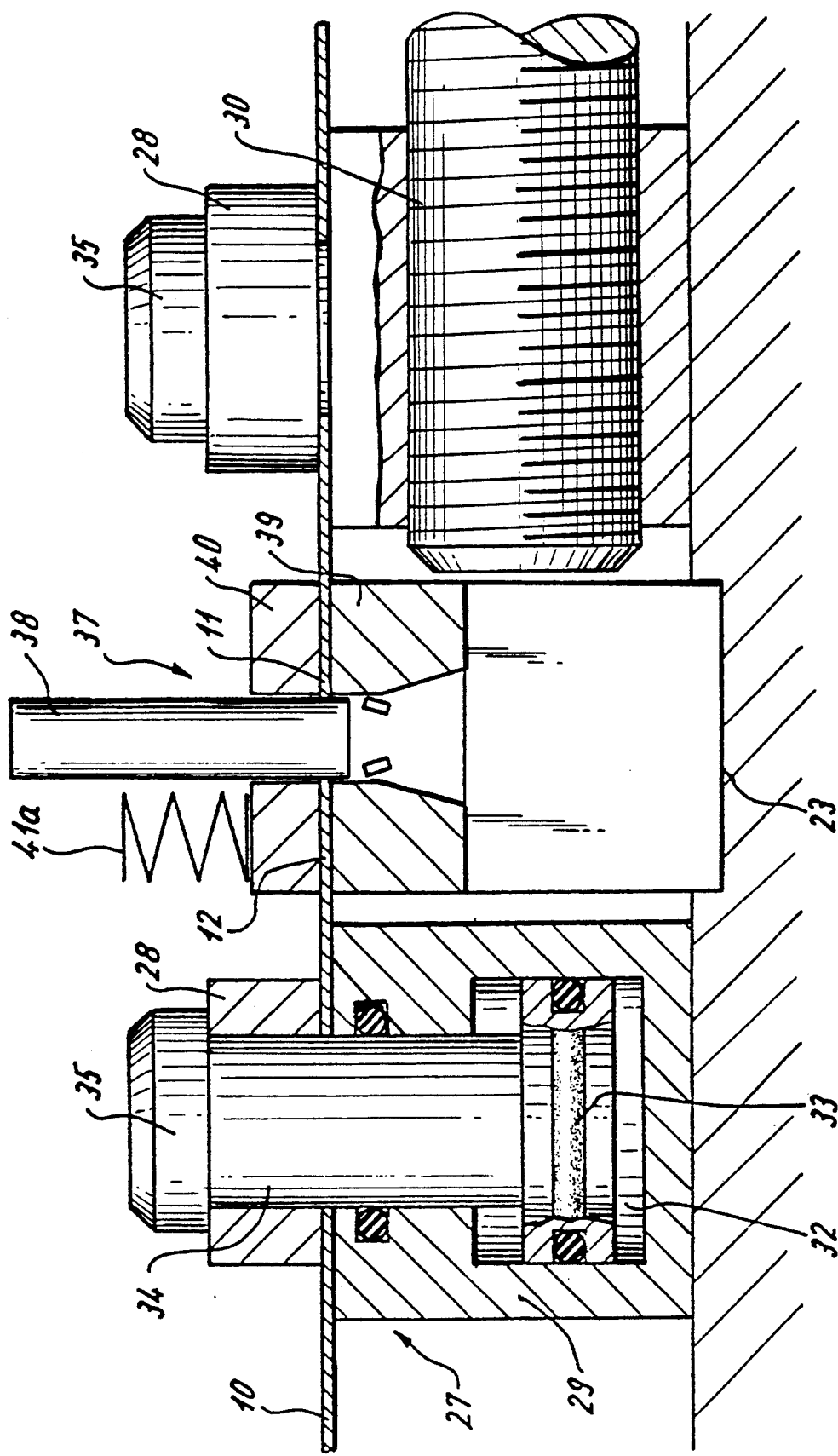
FIG. 3 illustrates the device equipped with a slicing mechanism while the strip is being trimmed.

The slicing mechanism 37 illustrated in FIG. 3 accommodates a blade 38, a matrix 39, and a hold-down 40, which is forced against the ends 11 and 12 of the strip by springs 41a. Before the ends are introduced into slicing mechanism 37, the tension on the strip is released by moving the axis 5 of drum 3 toward the stationary axis 4 of drum 2.

The transverse tensioning arms, which secure ends 11 and 12 can then be shifted toward the carriage to allow the ends to be introduced into the slicing mechanism.

Figure 4:
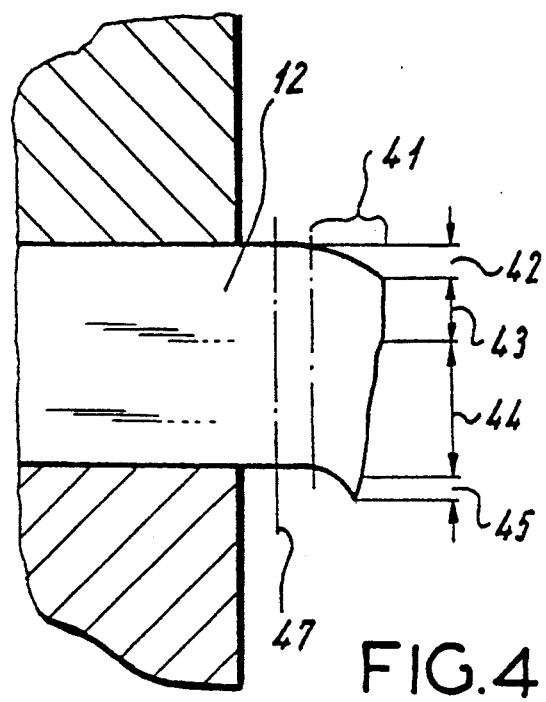
FIG. 4 illustrates one end of the strip with its deformed cross-section.
Figure 5:
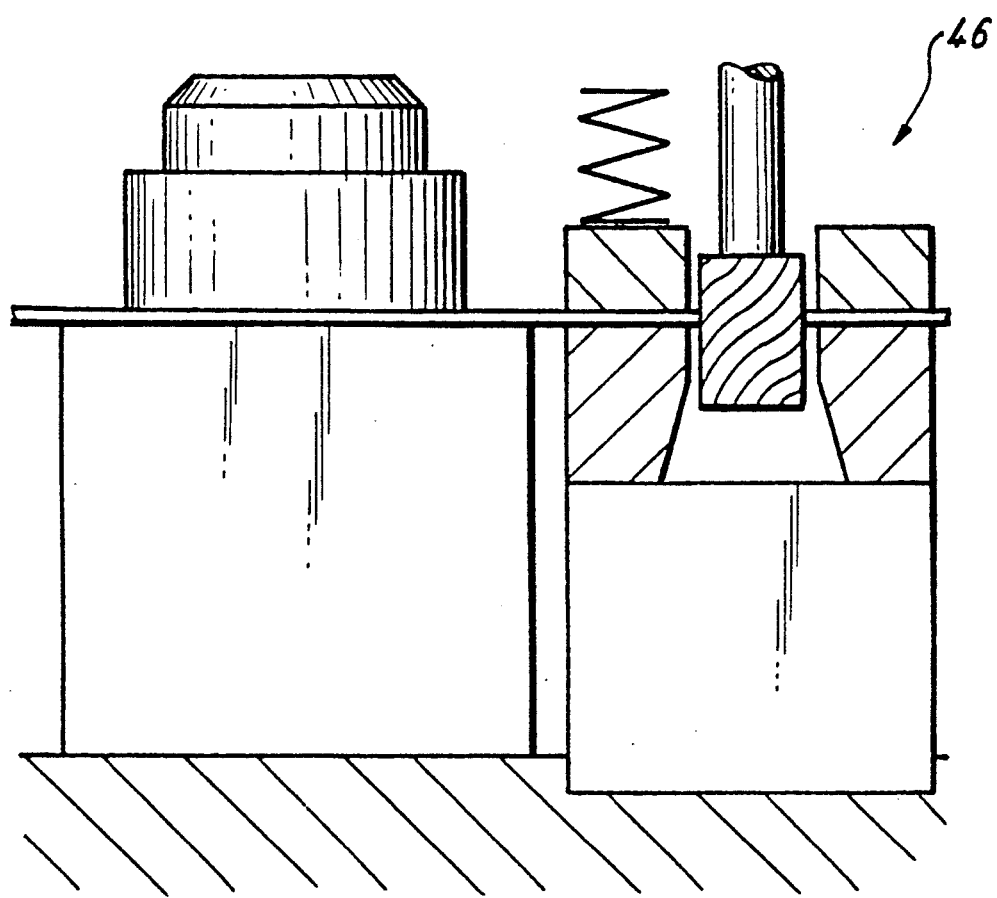
FIG. 5 is a view of part of the device equipped with a grinder instead of a slicing mechanism.

The cut end 41 left by the blade 38 a it trims the ends of the strip is illustrated in FIG. 4.

End 41 comprises an incision 42, a stump 43, a rip 44, and a burr 45.

The strip's rolling structure is unfolded inside end 41, which can lead to microscopic cracks in the soft iron matrix. Such cracks can impair the strength of the weld.

End 41 is accordingly ground down with a grinder 46 to an even edge 47. Cutting mechanism 37 is for this purpose replaced with grinder 46. The grinder is positioned on the carriage, and transverse tensioning arms 27 advance the ends of the strip together until the grinder can reach edges 47.

To weld the ends 11 and 12 of the strip together, the edges are either butted together or spaced a predetermined distance depending on the particular welding technique. Subsequent to welding, the seam can be further processed — annealed, recompacted hot or cold, polished, etc. — by appropriate means and tools mounted on the carriage.

It will be appreciated that the instant specification and claims are set forth by way of illustration and not limitation, and that various modifications and changes may be made without departing from the spirit and scope of the present invention.

What is claimed is:

1. A device for manufacturing loops of steel, comprising a base, two separate drums with the same diameter and with parallel axes mounted on said base, the axis of one drum being stationary and the other axis being transversely variable with respect to the one axis, at least one gripper for each end of a strip and a tensioning mechanism for connecting the grippers in order to apply tension to the strip, wherein the grippers have threaded bores therein and wherein the tensioning mechanism comprises a tensioning shaft with a right-handed thread on one end and a left-handed thread on the other end and wherein the ends of the shaft screw into the threaded bores in the grippers.

2. A device according to claim 1, wherein the base has rails at a right angle to the axis of the one drum and wherein the other drum has bearings to effect back and forth movement of the other drum and enable same to stop at various points on the rails.

3. A device according to claim 1, wherein each gripper has a jaw mechanism that accommodates ends of the strip, wherein each jaw mechanism has a tensioning piston on one side of the end of the strip and a tensioning disk on the other side of the end of the strip.

4. The device according to claim 3, wherein the diameter of the tensioning disk is the same as that of the piston and further comprising means mounting the tensioning disk and the piston for rotation in the gripper.

5. The device according to claim 1, having a longitudinal axis and wherein the grippers are mounted on a carriage that travels across the longitudinal axis and parallel to the axes of the drums.

6. The device according to claim 5, wherein the carriage includes flat guides that engage grooves in the grippers.

7. The device according to claim 6, further comprising a cutting mechanism, a grinder and a welding system on the carriage and wherein the gripper, cutting mechanism, grinder and welding system on the carriage are collectively changeable.

8. The device according to claim 1, including several pairs of grippers, and wherein the axes of the tensioning shafts are on the same level as and in a midplane of the ends of the strip.

9. The device according to claim 1, including a transverse tensioning arm on the base for securing the ends of the strip, the arm comprising a strap that extends over and beyond the width of the strip, means for tensioning ends of the strap, and a pedestal with threaded bores receptive of positioning shafts.

10. The device according to claim 9, further comprising a tensioning cylinder in the pedestal in the vicinity of the end of each strap, a piston that slides in and out of the cylinder, and a piston rod constituting a tensioning bolt equipped with a chuck and extending through a bore in the strap.

11. The device according to claim 1, wherein the drums comprise a series of disks with the same diameter and rotating around a common axis.

12. The device according to claim 1, wherein the drums have bearings internally thereof and resting against load-measuring cells.

* * * * *